United States Patent [19]

Sueshige et al.

[11] Patent Number: 4,856,607
[45] Date of Patent: Aug. 15, 1989

[54] APPARATUS FOR AUTOMATICALLY SETTING STEERING CENTER FOR USE IN POWER STEERING APPARATUS

[75] Inventors: Hirotaka Sueshige; Masayuki Hayashi, both of Aichi, Japan

[73] Assignee: Tokai TRW & Co., Ltd., Aichi, Japan

[21] Appl. No.: 177,672

[22] Filed: Apr. 5, 1988

[30] Foreign Application Priority Data

Apr. 7, 1987 [JP] Japan ................................. 62-85043

[51] Int. Cl.$^4$ ............................................. B62D 5/00
[52] U.S. Cl. .................................... 180/142; 180/148; 180/79.1; 364/424.01
[58] Field of Search ..................... 180/141, 142, 79.1, 180/148; 364/424.01

[56] References Cited

U.S. PATENT DOCUMENTS

| 4,616,727 | 10/1986 | Kircher et al. | 180/142 |
| 4,621,833 | 11/1986 | Soltis | 180/141 X |
| 4,708,220 | 11/1987 | Noto et al. | 180/142 |
| 4,720,790 | 1/1988 | Miki et al. | 180/142 X |

FOREIGN PATENT DOCUMENTS 62-231874 10/1987 Japan.
62-231875 10/1987 Japan.

Primary Examiner—Charles A. Marmor
Assistant Examiner—Brian L. Johnson
Attorney, Agent, or Firm—Tarolli, Sundheim & Covell

[57] ABSTRACT

An automatic steering center setting apparatus provided in a power steering system for a vehicle comprises a static steering motion detecting circuit for detecting a static steering motion state in response to a steering angle position signal which is obtained through a steering angle sensor and then a steering angle detecting circuit and for outputting a static steering center instruction signal; a dynamic steering motion detecting circuit for detecting a dynamic steering motion state and for outputting a dynamic steering center instruction signal; and a steering center setting circuit for setting a steering center and starting the function of a steering angle responsive characteristic when a current steering angle position signal coincides with the static or dynamic steering center instruction signal.

7 Claims, 4 Drawing Sheets

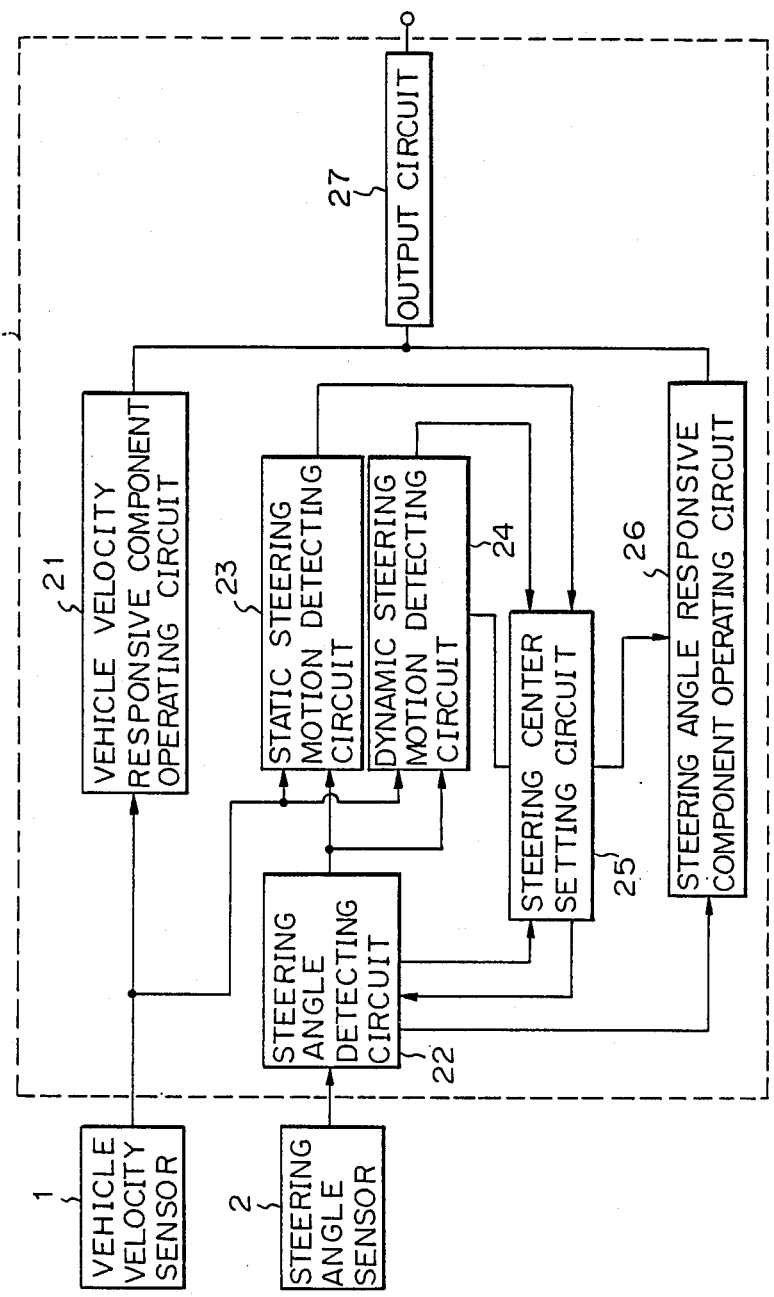

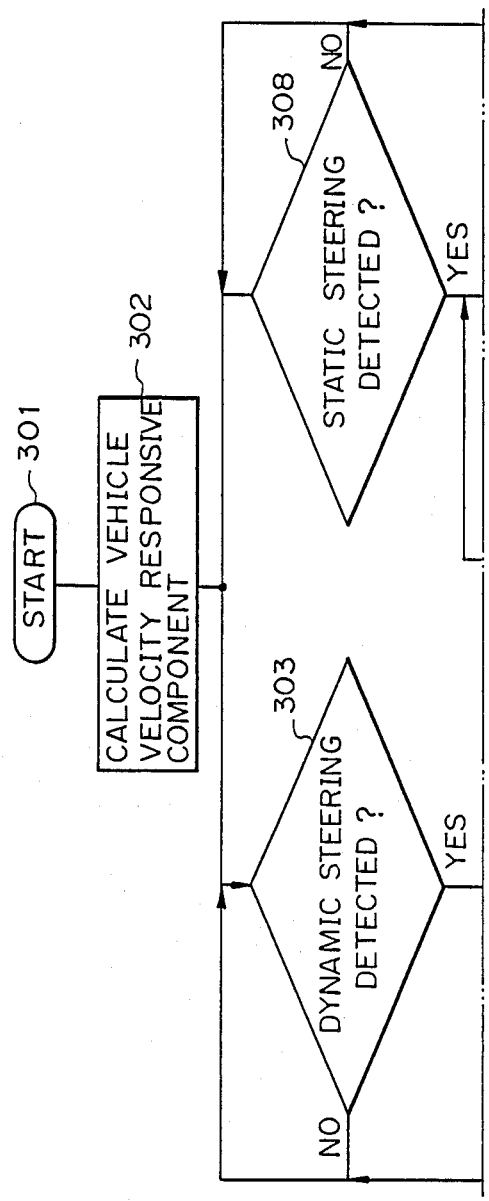

APPARATUS FOR AUTOMATICALLY SETTING STEERING CENTER FOR USE IN POWER STEERING APPARATUS

FIELD OF THE INVENTION

The present invention relates to an automatic steering center setting apparatus for a power steering apparatus for use in a vehicle which has a vehicle velocity responsive characteristic and a steering angle responsive characteristic.

DESCRIPTION OF THE RELATED BACKGROUND ART

FIG. 1 shows a typical power steering apparatus 10 for use in automobiles to which an automatic steering center setting apparatus of the present invention can be applied.

As shown in the diagram, a vehicle velocity signal from a vehicle velocity sensor 1 and a steering angle signal from a steering angle sensor 2 adapted to detect a rotational deviation of a steering wheel 11 are supplied to an electronic controller 12 such as a microcomputer or the like. On the basis of a preset program, the electronic controller 12 outputs a steering assist signal in response to the vehicle velocity indicated by the vehicle velocity signal, and the steering direction and the steering angle indicated by the steering angle signal. A hydraulic apparatus 13 is made operative by the steering assist signal and supplies a hydraulic pressure to a hydraulic pressure control valve 15 which is interlocked with a steering mechanism 14 such as a rack and pinion apparatus. Thus, power assistance suitable to the running state of the automobile and to the steering angle of the steering wheel 11 can be accomplished. In other words, the power steering apparatus as shown in the diagram has a vehicle velocity responsive characteristic and a steering angle responsive characteristic.

The steering assist signal may not be used to make the hydraulic apparatus 13 operative but may instead be directly supplied to an electric motor to actuate the steering mechanism.

In such a power steering apparatus, particularly in a power steering apparatus having a steering angle responsive characteristic, in order to adjust the steering force in accordance with the right and left steering angles, the steering center needs to be detected or determined by a steering angle sensor.

In the conventional power steering apparatus having a steering angle responsive characteristic, the function of the steering angle responsive characteristic is started simultaneously with the start of a steering operation. Therefore, when the position of the steering center, which is detected by the angle sensor and serves as a reference for the steering power assistance responsive to the steering angle, deviates from the true steering center position the steering angle responsive characteristic suddenly functions and the steering power assistance suddenly changes. Therefore, the steering stability is adversely affected and this may cause an accident.

On the other hand, a potentiometer is used as a conventional angle sensor adapted to detect the steering center position in order to detect any change in electric resistance value depending on the steering operation, or alternatively a mechanical sensor adapted to detect a movement deviation of a rack bar in a steering mechanism having a rack and pinion structure is employed. However, the life of such sensors is short and they are expensive to provide. In particular, the mechanical sensor has a drawback in that the structure is complicated since it is attached to the steering mechanism.

SUMMARY OF THE INVENTION

The present invention has been achieved in order to solve the foregoing problems and it is an object of the invention to provide an automatic steering center setting apparatus for use in a power steering apparatus in which a proper steering center is determined after running of the vehicle is started, and when the steering wheel has reached the center position during steering, the application of the steering angle responsive characteristic to the steering power assistance can be started.

Another object of the invention is to provide an automatic steering center setting apparatus of the digital type having a simple constitution and high reliability in which an incremental type rotary encoder which can measure a steering angle by counting an amount of pulses is used as an angle sensor to detect the steering center.

According to the invention, there is provided an automatic steering center setting apparatus comprising: a static steering motion detecting circuit for detecting a static steering motion state in response to a steering angle position signal which is obtained through a steering angle sensor and then a steering angle detecting circuit and for outputting a static steering center instruction signal; a dynamic steering motion detecting circuit for detecting a dynamic steering motion state and for outputting a dynamic steering center instruction signal; and a steering center setting circuit for setting a steering center and starting a function of a steering angle responsive characteristic when a current steering angle position signal coincides with the static or dynamic steering center instruction signal.

According to the invention, after the running of the vehicle has been started, when the steering center calculated in the dynamic steering motion state coincides with the present position of the steering wheel, the steering center is newly set or updated and, at the same time, the steering angle responsive characteristic function is started. On the other hand, when the steering center calculated in the static steering motion state coincides with the present position of the steering wheel, the steering center is set and, at the same time, the steering angle responsive characteristic function is started in a manner similar to the foregoing case; however, the function of detecting the dynamic steering motion is later stopped. After the setting of the steering center in the static steering motion state has been performed a few times, it is assumed that the true steering center has been decided, and this set state is fixed. In this manner, the setting operation of the steering center is completed.

According to the present invention, the steering center can be determined by the arithmetic operation by using sensor as a steering angle an incremental type rotary encoder which can measure a steering angle by counting pulses. Therefore, as compared with the case where, for example, a conventional potentiometer or mechanical sensor is used, the whole apparatus can be realized at a reasonable cost with a simple constitution.

Furthermore, according to the invention, particularly in the case of detecting the dynamic steering motion, only when the steering center derived by the calculation coincides with the present steering position is the steering angle responsive characteristic applied to the steering power assist signal, so that the function of the steering angle responsive characteristic is always started from the steering center position. Therefore, the smooth steering power assist control can be accomplished without suddenly changing the level of steering power.

BRIEF DESCRIPTION OF THE DRAWINGS

FIG. 2 is a block diagram showing an exemplary constitution of the automatic steering center setting apparatus of the invention; and FIG. 3A is a first portion of a flowchart to assist in explaining the whole operation of the apparatus in FIG. 2.

DETAILED DESCRIPTION OF THE PREFERRED EMBODIMENT

Figure 1:
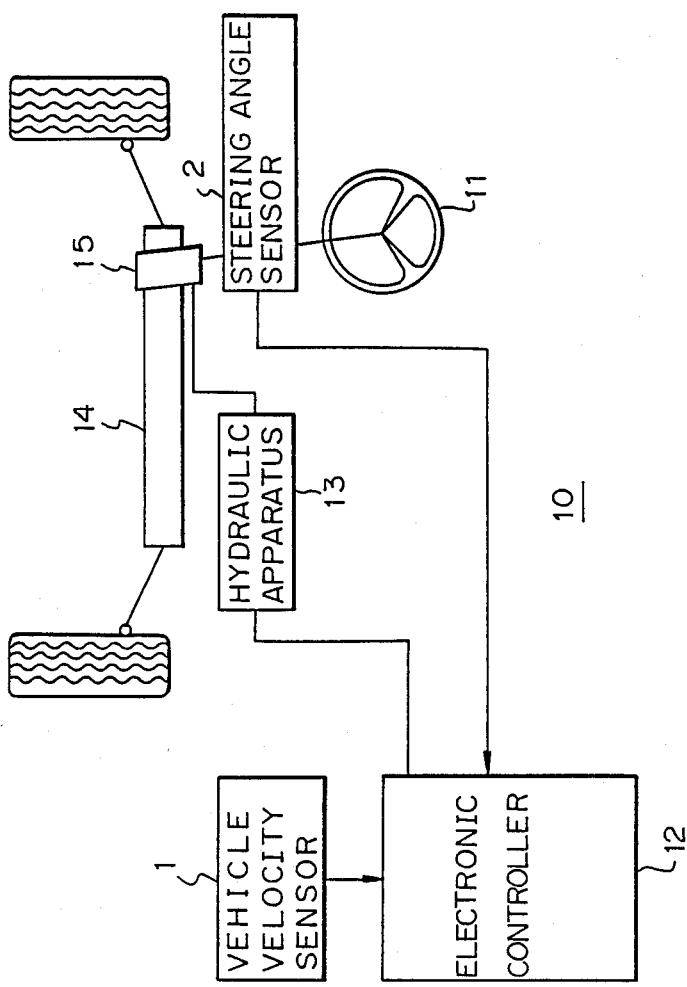
FIG. 1 is a schematic diagram of a general power steering apparatus for use in an automobile in which an automatic steering center setting apparatus of the present invention is assembled.

FIG. 2 is a block diagram showing an exemplary constitution of an automatic steering center setting apparatus 20 according to the invention, the function of which may be carried out by a micro-computer. This apparatus also has the function of the electronic controller 12 in the power steering apparatus in FIG. 1.

Figure 3B:
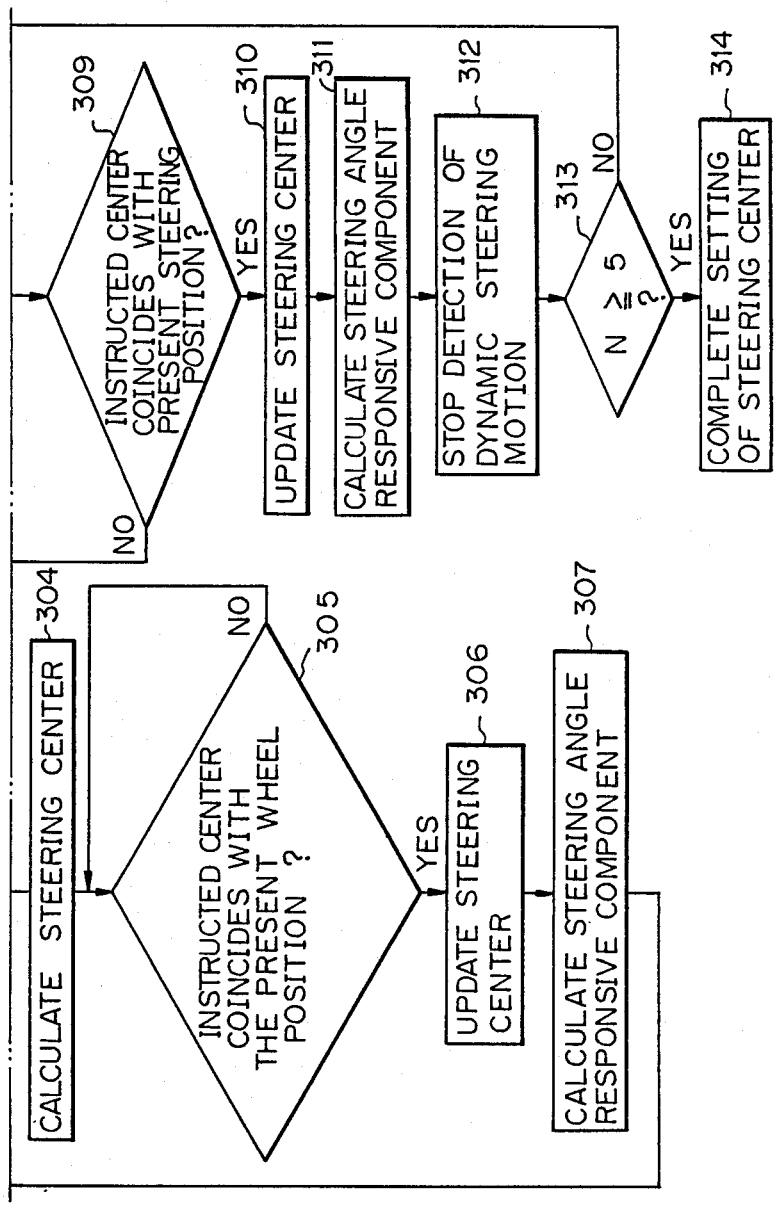
FIG. 3B is a second portion of the flow chart to assist in explaining the whole operation of the apparatus in FIG. 2.

FIG. 3 is a flowchart utilized in explaining the operation of the setting apparatus 20 in FIG. 2.

In FIG. 2, a circuit 21 for arithmetically operating the component responsive to a vehicle velocity outputs a steering power assist signal to which is applied the vehicle velocity responsive characteristic suitable for the running state, in response to the vehicle velocity signal from the vehicle velocity sensor 1.

The steering angle sensor 2 consists of, e.g., an optical rotary encoder of the incremental type which can measure a steering angle by counting an amount of pulses. Practically speaking, a rotary plate having a number of slits in the circumferential direction is attached to a column shaft of a steering wheel. A fixed plate having two kinds of slits having different pitches is provided so as to face the rotary plate. The transmitted lights obtained through the slits of the rotary plate and through the slits of the fixed plate are detected by two photo sensitive devices, thereby measuring the rotational angle. At the same time, the rotating direction is determined by the phase difference between the detection signals of the photo sensitive devices. The present invention is not limited to the optical type and a rotary encoder consisting of a Hall IC and a magnet can also be employed.

The operation of a steering angle detecting circuit 22 starts, for example, when an engine is started or a power source (not shown) of the setting apparatus 20 is turned on. In response to a steering angle encoded signal which is output from the steering angle sensor 2, the steering angle detecting circuit 22 outputs a steering angle position signal which changes in reference to the position of the steering wheel in the initial state as a false steering center. The steering center which has been first set by the steering angle detecting circuit 22 in this manner is thereafter newly set or updated in response to a steering center set signal which is output from a steering center setting circuit 25 as will be explained later.

A static steering motion detecting circuit 23 detects a fine steering angle state which is not detected by the steering angle sensor 2 while the vehicle is running straight ahead, namely, a state in which the steering wheel is hardly rotated at all. The detecting circuit 23 receives the vehicle velocity signal from the vehicle velocity sensor 1 and the steering angle position signal from the steering angle detecting circuit 22 and detects the state where the steering wheel is substantially not operated at all, i.e., the state within a very small steering angle range at a predetermined vehicle velocity (e.g., 15 km/h) or more for a predetermined period of time (e.g., 20 seconds) and outputs a static steering center instruction signal.

A dynamic steering motion detecting circuit 24 monitors the steering state in which the steering angle sensor 2 operates during running. The detecting circuit 24 receives the vehicle velocity signal from the vehicle velocity sensor 1 and the steering angle position signal from the steering angle detecting circuit 22 and executes addition or subtraction of a steering angle position signal which corresponds to right or left rotation of the steering wheel at the foregoing predetermined vehicle velocity or more and which has been increased or decreased relative to the steering angle position signal corresponding to the steering center which had previously been set by the steering angle detecting circuit 22. Then, the dynamic steering motion detecting circuit 24 outputs an average value for every constant sampling time as a dynamic steering center instruction signal.

The steering center setting circuit 25 compares the static or dynamic steering center instruction signal with the present steering angle position signal from the steering angle detecting circuit 22. When both signals coincide, the steering center setting circuit 25 outputs a steering angle responsive ON signal and supplies the steering center set signal to the steering angle detecting circuit.

When the static steering center instruction signal coincides with the present steering angle position signal, the steering angle responsive ON signal is output as mentioned above. At the same time, a dynamic steering motion detection OFF signal is output as will be understood from the description of the flowchart in FIG. 3 which will be explained later. This OFF signal acts to stop the subsequent operation of the dynamic steering motion detecting circuit 24.

A circuit 26 for arithmetically operating the component responsive to the steering angle is connected at the input side to an output of the steering angle detecting circuit 22 and to an output of the steering center setting circuit 25. When the operating circuit 26 receives the steering angle responsive ON signal, it then outputs a steering power assist signal to which is applied the steering angle responsive characteristic suitable for the steering angle in response to the steering angle position signal from the steering angle detecting circuit 22.

The steering power assist signal generated by the vehicle velocity responsive component operating circuit 21 and the steering power assist signal generated by the steering angle responsive component operating means 26 are combined. Thereafter, the combined signal is supplied as a steering power assist drive signal to, for example, an electric power system of the hydraulic apparatus 13 (FIG. 1) through an output circuit 27.

The whole operation of the automatic steering center setting apparatus of the invention will now be described hereinbelow with reference to the flowchart in FIG. 3.

First, by starting the engine (step 301), the electronic controller 12 is made operative and, at the same time, the vehicle velocity responsive component operating circuit 21 starts operating (step 302).

When the steering angle sensor 2 senses the rotation of the steering wheel 11, the steering angle detecting circuit 22 outputs a steering angle encoded signal (step 303). The dynamic steering motion detecting circuit 24 receives the steering angle position signal and executes addition or subtraction of the steering angle position signal which corresponds to right or left rotation of the steering wheel and which has been increased or decreased relative to the steering angle position signal of the steering center as mentioned above, thereby calculating the steering center (step 304). Then, the detecting circuit 24 outputs the dynamic steering center instruction signal.

The steering center setting circuit 25 continuously compares the dynamic steering center instruction signal from the dynamic steering motion detecting circuit 24 with the steering angle encoded signal from the steering angle detecting circuit 22, namely, compares the steering center obtained by the arithmetic operation with the present position of the steering wheel (step 305). When both of them coincide, the steering center set signal is output and the steering angle position signal of the steering center from the steering angle detecting circuit 22 is updated (step 306). At the same time, the steering angle responsive ON signal is output (step 307). Thus, the steering angle responsive component operating circuit 26 starts operating and outputs the steering power assist signal having the steering angle responsive characteristic.

The processes in steps 303 to 307 are repeated until a static steering motion is detected The steering center is successively calculated.

On the other hand, if the steering wheel is not rotated at all or steering is conducted at an angle within a very small steering angle range, this state is not sensed by the steering angle sensor 2, so the output from the steering angle detecting circuit 22 does not change. The static steering motion detecting circuit 23 monitors such a holding state (step 308). If this state has continued for a predetermined period of time, the position of the steering wheel at this time is determined as a center and then a static steering center instruction signal is output.

The steering center setting circuit 25 compares the static steering center instruction signal from the static steering motion detecting circuit 23 with the present steering angle position signal from the steering angle detecting circuit 22 (step 309). When both signals coincide, the steering center set signal is output and the steering angle position signal of the steering center which has previously been set by the steering angle detecting circuit 22 is updated (step 310). At the same time, the steering angle responsive ON signal is output to start the operation of the steering angle responsive component operating circuit 26 (step 311). At this time, the steering center setting circuit 25 outputs a dynamic steering motion detection OFF signal, thereby stopping the function of the dynamic steering motion detecting circuit 24 (step 312). Due to this, both of the functions of detecting the static and dynamic steering motions can be simultaneously effected after the engine is started. However, if the steering center has once been decided by the detection of the static steering motion the dynamic steering motion is no longer detected after that.

The procedure for setting the steering center by the detection of the static steering motion, namely, the processes in steps 308 to 312, is repeated N (e.g., 5) times (step 313). When the steering center set by the detection of the static steering motion has continuously indicated the same position N times, in other words, when the same steering center set signal has been given to the steering angle detecting circuit 22 N times, this steering center is decided to be the true center position. The steering angle position signal indicative of the center at this time is fixed and the operation of setting the steering center is thus completed (step 314). This fixed steering center is held until the engine is stopped.

What is claimed is:

1. In a power steering system for a vehicle which is adapted to control an amount of steering power assistance by means of a steering power assist signal to which a vehicle velocity responsive characteristic and steering angle responsive characteristic are added in response to a vehicle velocity signal from vehicle velocity sensor means and a steering angle signal from steering angle sensor means, an automatic steering center setting apparatus for providing a rotational reference for a steering wheel so as to effect the function of the steering angle responsive characteristic during a running state of the vehicle, said center setting apparatus comprising:

steering angle detecting means for setting a presumed position of said steering wheel as a steering center in response to said steering angle signal and for outputting a steering angle position signal which changes about said steering center;

static steering motion detecting means for calculating said steering angle position signal during the steering and, when the calculated steering angle position signal indicates a static steering motion state, for outputting a static steering center instruction signal;

dynamic steering motion detecting means for calculating the steering angle position signal during the steering and, when the calculated steering angle position signal indicates a dynamic steering motion state, for outputting a dynamic steering center instruction signal, said dynamic steering motion detecting means executing addition or subtraction of said steering angle position signal which is increased or decreased relative to said presumed position which had been set as said steering center, and outputting an average value for every constant sampling period of time as said dynamic steering center instruction signal; and steering center setting means for outputting a steering angle responsive ON signal to start the function of said steering angle responsive characteristic and a steering center set signal to update said steering center set by said steering angle detecting means when the present steering angle position signal during the steering coincides with either the static steering center instruction signal or the dynamic steering center instruction signal.

2. An apparatus according to claim 1, wherein said steering angle sensor means consists of an incremental type rotary encoder which can measure a steering angle of the steering wheel as an amount of pulses.

3. An apparatus according to claim 1 or 2, wherein said static steering motion detecting means outputs said static steering center instruction signal when the steering wheel is substantially not operated, that is, when said steering angle sensor does not operate and said steering angle position signal indicates a steering state of a rotational angle within a very small steering angle range for a predetermined period of time.

4. An apparatus according to claims 1, wherein said static steering motion detecting means and said dynamic steering motion detecting means start operating when the vehicle velocity signal from said vehicle velocity sensor means exceeds a preset value.

5. An apparatus according to claim 1, wherein said steering center setting means outputs a dynamic steering motion detection OFF signal to stop the operation of said dynamic steering motion detecting means when said static steering center instruction signal coincides with the present steering angle position signal.

6. An apparatus according to claim 1, wherein when said steering angle detecting means continuously receives the same number of steering center set signals as a predetermined number from said steering center setting means, the updated steering center is fixed and the steering angle detecting operation is completed.

7. An automatic steering center setting apparatus for a vehicle comprising:
   steering angle detecting means for detecting a steering angle and for outputting a steering angle position signal;
   static steering motion detecting means for detecting steering angles within a predetermined steering angle range and for outputting a static steering center instruction signal in response to the steering angles being within said predetermined steering angle range for a predetermined period of time;
   dynamic steering motion detecting means for detecting steering angles outside said predetermined steering angle range and for outputting a dynamic steering center instruction signal; and
   steering center setting means for comparing the static steering center instruction signal or the dynamic steering center instruction signal with the steering angle position signal and for outputting a steering center set signal when the static steering center instruction signal or the dynamic steering center instruction signal coincides with the steering angle position signal.

* * * * *